US011388607B2

(12) United States Patent
De Sousa Chaves

(10) Patent No.: US 11,388,607 B2
(45) Date of Patent: Jul. 12, 2022

(54) OPPORTUNISTIC AND EFFICIENT SPECTRUM SHARING BETWEEN PRIORITY ACCESS AND GENERAL ACCESS USERS

(71) Applicant: NOKIA TECHNOLOGIES OY, Espoo (FI)

(72) Inventor: Fabiano De Sousa Chaves, Morris Plains, NJ (US)

(73) Assignee: NOKIA TECHNOLOGIES OY, Espoo (FI)

( * ) Notice: Subject to any disclaimer, the term of this patent is extended or adjusted under 35 U.S.C. 154(b) by 76 days.

(21) Appl. No.: 16/955,333

(22) PCT Filed: Dec. 21, 2017

(86) PCT No.: PCT/US2017/067942
§ 371 (c)(1),
(2) Date: Jun. 18, 2020

(87) PCT Pub. No.: WO2019/125470
PCT Pub. Date: Jun. 27, 2019

(65) Prior Publication Data
US 2021/0022009 A1 Jan. 21, 2021

(51) Int. Cl.
*H04W 16/14* (2009.01)
*H04W 76/25* (2018.01)
(Continued)

(52) U.S. Cl.
CPC ........... *H04W 16/14* (2013.01); *H04W 60/02* (2013.01); *H04W 72/048* (2013.01); *H04W 72/1247* (2013.01); *H04W 76/25* (2018.02)

(58) Field of Classification Search
None
See application file for complete search history.

(56) References Cited

U.S. PATENT DOCUMENTS

| 2016/0094998 A1* | 3/2016 | Bhushan | H04W 16/14 455/454 |
| 2016/0286549 A1* | 9/2016 | Abraham | H04W 48/08 |
| 2018/0132240 A1* | 5/2018 | Yang | H04W 16/14 |

OTHER PUBLICATIONS

International Search Report and Written Opinion dated Sep. 7, 2018 corresponding to International Patent Application No. PCT/US2017/067942.

(Continued)

*Primary Examiner* — Alex Skripnikov
(74) *Attorney, Agent, or Firm* — Squire Patton Boggs (US) LLP

(57) ABSTRACT

In an embodiment, a method may include transmitting, by a priority access user, one or more registration request messages to a spectrum access system. The method may further include receiving, by the priority access user, one or more registration response messages from the spectrum access system. The one or more registration response messages may contain an indication that the spectrum access system has time granular sharing capability. The method may further include transmitting, by the priority access user, one or more heartbeat messages to the spectrum access system. The one or more heartbeat messages may contain an indication of a heartbeat interval. The method may further include receiving, by the priority access user, one or more heartbeat response messages from the spectrum access system. The heartbeat response messages may contain an indication of a heartbeat interval that is longer than the indication of the one or more heartbeat messages.

21 Claims, 11 Drawing Sheets

(51) Int. Cl.
*H04W 60/02* (2009.01)
*H04W 72/04* (2009.01)
*H04W 72/12* (2009.01)

(56) References Cited

OTHER PUBLICATIONS

Wireless Innovation Forum: "CBRS Protocols Technical Report," Document WINNF-TR-0205, Aug. 1, 2017, XP002784255.
Wireless Innovation Forum: "Signaling Protocols and Procedures for Citizens Broadband Radio Service (CBRS): Spectrum Access System (SAS)—Citizens Broadband Radio Service Device (CBSD) Interface Technical Specification," Document WINNF-16-S-0016, Nov. 29, 2016, XP055466934.
Sohul, et al., "Spectrum Access System for the Citizen Broadband Radio Service", IEEE Communications Magazine, Jul. 2015, 5G Spectrum: Enabling the Future Mobile Landscape, pp. 18-25.
European Communication pursuant to Article 94(3) EPC, corresponding to EP Application No. 17 832 849.8, dated Mar. 9, 2022.

\* cited by examiner

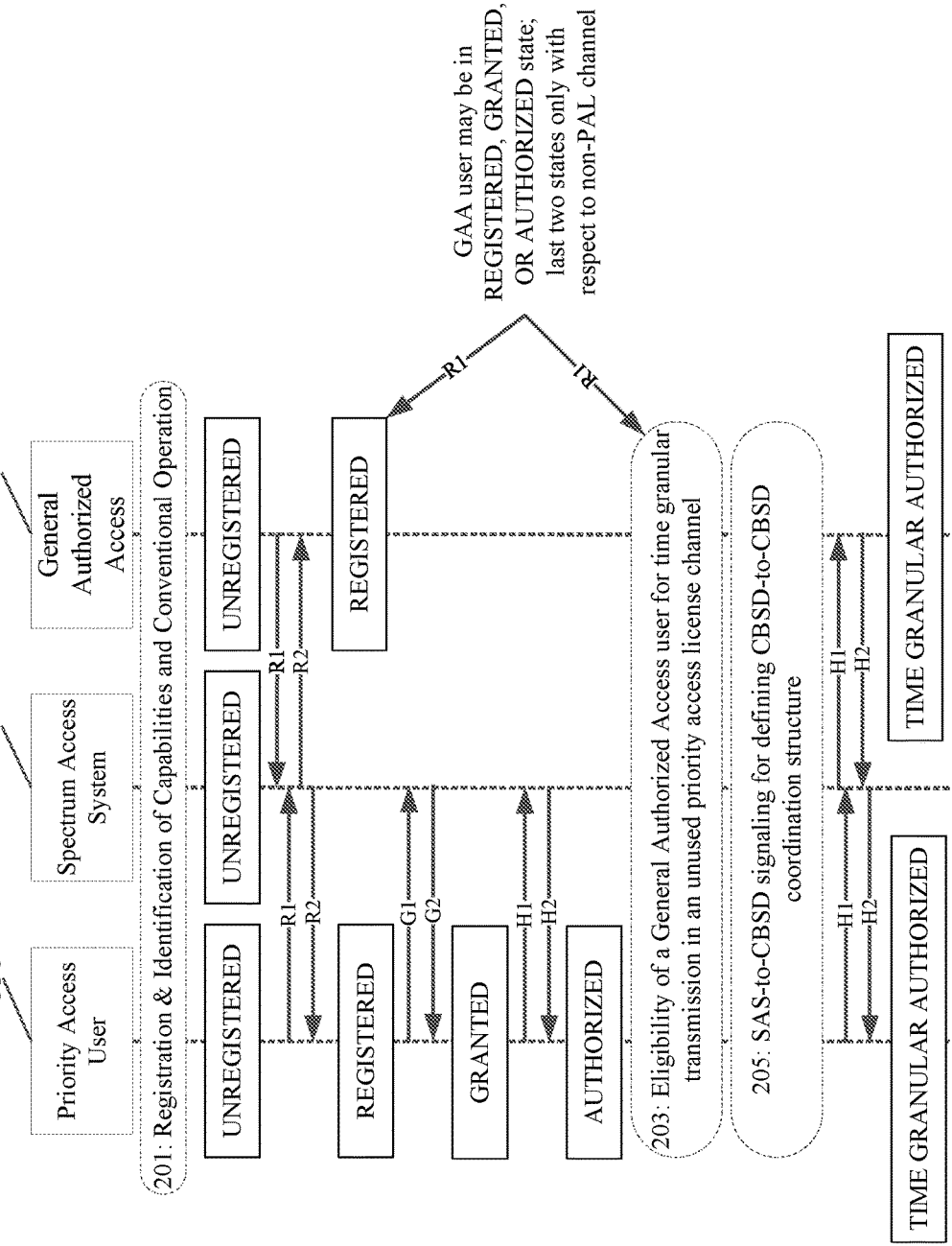

Figure 4

Main fields of R1 – Registration Request message

| Parameter Name | Type | Note |
|---|---|---|
| "userId" | String | Required |
| "fccId" | String | Required |
| "cbsdSerialNumber" | String | Required |
| "cbsdCategory" | String | Conditional |
| "cbsdInfo" | Object | Optional |
| "airInterface" | Object | Conditional |
| "installationParam" | Object | Conditional: carries location and technical information |
| "measCapability" | Array of string | Conditional: carries technical information |

Figure 5

Main fields of G2 – Grant Response message

| Parameter Name | Type | Note |
|---|---|---|
| "cbsdId" | String | Conditional |
| "grantId" | String | Conditional |
| "grantExpireTime" | String | Conditional: indicates UTC time when Grant expires, expressed using format YYYY-MM-DDThh:mm:ssZ |
| "heartbeatInterval" | Number | Conditional: indicates maximum time interval in seconds between two consecutive heartbeat requests |
| "measReportConfig" | Array of string | Optional |
| "operationParam" | Object | Optional |
| "channelType" | String | Conditional |
| "response" | Object | Required |

Figure 6

Main fields of H1 – Heartbeat Request Message

| Parameter Name | Type | Note |
|---|---|---|
| "cbsdId" | String | Required |
| "grantId" | String | Required |
| "grantRenew" | Boolean | Optional |
| "operationState" | String | Required: contains CBSD operation state ("AUTHORIZED" or "GRANTED") |
| "measReport" | Object | Conditional |

Figure 7

Main fields of H2 – Heartbeat Response message

| Parameter Name | Type | Note |
|---|---|---|
| "cbsdId" | String | Conditional |
| "grantId" | String | Conditional |
| "transmitExpireTime" | String | Required; indicates UTC time that CBSD may transmit until, expressed using format YYYY-MM-DDThh:mm:ssZ |
| "grantExpireTime" | String | Conditional |
| "heartbeatInterval" | Number | Optional; positive integer in units of seconds; allows SAS to change heartbeat interval |
| "operationParam" | Object | Optional; allows SAS to provide new set of operation parameters to CBSD |
| "measReportConfig" | Array of strings | Optional |
| "response" | Object | Required |

Figure 8

Fields proposed to be added to the H2 – Heartbeat Response message

| Parameter Name | Type | Note |
|---|---|---|
| "synchronizationTime" | String | Optional; expressed using format YYYY-MM-DDThh:mm:ssZ*;relative to step 3(a) |
| "coordinationWindowTimeOffset" | Number | Optional; positive integer in units of seconds**; relative to step 3(b) |
| "coordinationWindowTimeDuration" | | |
| "coordinationWindowTimePeriod" | | |
| "inactivityTime" | Number | Optional; positive integer indicating number of consecutive coordination windows without transmissions from Priority Access user over which:<br>1) Priority Access user has to take some action before resuming/starting transmission<br>2) GAA user is allowed to use channel |

Structure of coordination windows in the PAL channel for operation of Priority Access users and GAA users in a "TimeGranularAuthorized" state

OPPORTUNISTIC AND EFFICIENT SPECTRUM SHARING BETWEEN PRIORITY ACCESS AND GENERAL ACCESS USERS

BACKGROUND

Field

Certain embodiments may relate to sharing frequency bands, for example, some embodiments may relate to signaling between a spectrum access system and a citizens broadband radio service device.

Description of the Related Art

In the United States, the Federal Communications Commission (FCC) has established a three-tier architecture for spectrum sharing. The first tier includes incumbent services, such as military radio location service (RLS), fixed satellite service (FSS), and some terrestrial wireless broadband service. Incumbent services in this first tier receive full protection against interference from services in lower tiers. For example, lower tiers may include citizens broadband radio service (CBRS) devices (CBSDs). CBRS may be divided into two tiers: priority access (PA) user devices and general authorized access (GAA) user devices.

Spectrum sharing may be provided by establishing a protection area around higher priority user devices, and may prevent any use of spectrum in a determined area by lower priority user devices. When higher priority user devices are temporarily not using certain spectrum resources, lower priority user devices may use these resources temporarily.

However, some disadvantages may arise from this framework. For example, the determination about inactivity of a PA user device may be made using various criteria, such as a long period of inactivity by the PA user device prompting the spectrum access system (SAS) to determine that a channel is not being used, such as by a CBSD. In addition, an SAS-CBSD message exchange may require a relatively long period of time compared to the time required across different radio access technologies (RATs). Furthermore, the resumption of PA user device transmissions may require a long period of time to initiate due to the exchange of numerous messages between the SAS and GAA and PA user devices. Thus, a bottleneck in SAS-CBSD communication may occur during coordination of PA user devices and GAA user devices while requiring that PA user devices have operations unaffected by GAA user device transmissions.

SUMMARY

In accordance with an embodiment, a method may include transmitting, by a priority access user device, one or more registration request messages to a spectrum access system. The one or more registration request messages may contain an indication that the priority access user device has time granular sharing capability. The method may further include receiving, by the priority access user device, one or more registration response messages from the spectrum access system. The one or more registration response messages may contain an indication that the spectrum access system has time granular sharing capability. The method may further include transmitting, by the priority access user device, one or more heartbeat messages to the spectrum access system. The one or more heartbeat messages may contain an indication of a heartbeat interval. The method may further include receiving, by the priority access user device, one or more heartbeat response messages from the spectrum access system. The one or more heartbeat response messages may contain an indication of a heartbeat interval that is longer than the indication of the one or more heartbeat messages.

In accordance with an embodiment, an apparatus may include at least one processor and at least one memory including computer program code. The at least one memory and the computer program code may be configured to, with the at least one processor, cause the apparatus to at least transmit one or more registration request messages to a spectrum access system. The one or more registration request messages may contain an indication that the priority access user device has time granular sharing capability. The at least one memory and the computer program code may be further configured to, with the at least one processor, cause the apparatus to at least receive one or more registration response messages from the spectrum access system. The one or more registration response messages may contain an indication that the spectrum access system has time granular sharing capability. The at least one memory and the computer program code may be further configured to, with the at least one processor, cause the apparatus to at least transmit one or more heartbeat messages to the spectrum access system. The one or more heartbeat messages may contain an indication of a heartbeat interval. The at least one memory and the computer program code may be further configured to, with the at least one processor, cause the apparatus to at least receive one or more heartbeat response messages from the spectrum access system. The one or more heartbeat response messages may contain an indication of a heartbeat interval that is longer than the indication of the one or more heartbeat messages.

In accordance with an embodiment, an apparatus may include means for transmitting, by a priority access user device, one or more registration request messages to a spectrum access system. The one or more registration request messages may contain an indication that the priority access user device has time granular sharing capability. The apparatus may further include means for receiving, by the priority access user device, one or more registration response messages from the spectrum access system. The one or more registration response messages may contain an indication that the spectrum access system has time granular sharing capability. The apparatus may further include means for transmitting, by the priority access user device, one or more heartbeat messages to the spectrum access system. The one or more heartbeat messages may contain an indication of a heartbeat interval. The apparatus may further include means for receiving, by the priority access user device, one or more heartbeat response messages from the spectrum access system. The one or more heartbeat response messages may contain an indication of a heartbeat interval that is longer than the indication of the one or more heartbeat messages.

A non-transitory computer readable medium may, in certain embodiments, be encoded with instructions that, when executed in hardware, perform a process. The process may include a method for transmitting, by a priority access user device, one or more registration request messages to a spectrum access system. The one or more registration request messages may contain an indication that the priority access user device has time granular sharing capability. The process may further include a method for receiving, by the priority access user device, one or more registration response messages from the spectrum access system. The one or more registration response messages may contain an indication that the spectrum access system has time granular sharing capability. The process may further include a method for transmitting, by the priority access user device, one or more heartbeat messages to the spectrum access system. The one or more heartbeat messages may contain an indication of a heartbeat interval. The process may further include a method for receiving, by the priority access user device, one or more heartbeat response messages from the spectrum access system. The one or more heartbeat response messages may contain an indication of a heartbeat interval that is longer than the indication of the one or more heartbeat messages.

A computer program product may, according to certain embodiments, encode instructions for performing a process. The process may include a method that can transmit one or more registration request messages to a spectrum access system. The one or more registration request messages may contain an indication that the priority access user device has time granular sharing capability. The process may further include a method that can receive one or more registration response messages from the spectrum access system. The one or more registration response messages may contain an indication that the spectrum access system has time granular sharing capability. The process may further include a method that can transmit one or more heartbeat messages to the spectrum access system. The one or more heartbeat messages may contain an indication of a heartbeat interval. The process may further include a method that can receive one or more heartbeat response messages from the spectrum access system. The one or more heartbeat response messages may contain an indication of a heartbeat interval that is longer than the indication of the one or more heartbeat messages.

BRIEF DESCRIPTION OF THE DRAWINGS

For proper understanding of this disclosure, reference should be made to the accompanying drawings, wherein:

FIG. 3 illustrates another example of a system according to certain embodiments.

FIG. 4 illustrates an example of data according to certain embodiments.

FIG. 5 illustrates another example of data according to certain embodiments.

FIG. 6 illustrates another example of data according to certain embodiments.

FIG. 7 illustrates another example of data according to certain embodiments.

FIG. 8 illustrates another example of data according to certain embodiments.

DETAILED DESCRIPTION

The features, structures, or characteristics of certain embodiments described throughout this specification may be combined in any suitable manner in one or more embodiments. For example, the usage of the phrases "certain embodiments," "some embodiments," "other embodiments," or other similar language, throughout this specification refers to the fact that a particular feature, structure, or characteristic described in connection with the embodiment may be included in at least one embodiment of the present invention. Thus, appearance of the phrases "in certain embodiments," "in some embodiments," "in other embodiments," or other similar language, throughout this specification does not necessarily refer to the same group of embodiments, and the described features, structures, or characteristics may be combined in any suitable manner in one or more embodiments. Some embodiments discussed below relate to radio access technologies (RATs) including New Radio (NR), $5^{th}$ generation (5G), LTE-A, LTE 4th generation, Internet of Things (IoT), wireless local area networks (WLANs), such as IEEE 802.11 WLAN, LTE-LAA, LTE-U.

Figure 1:
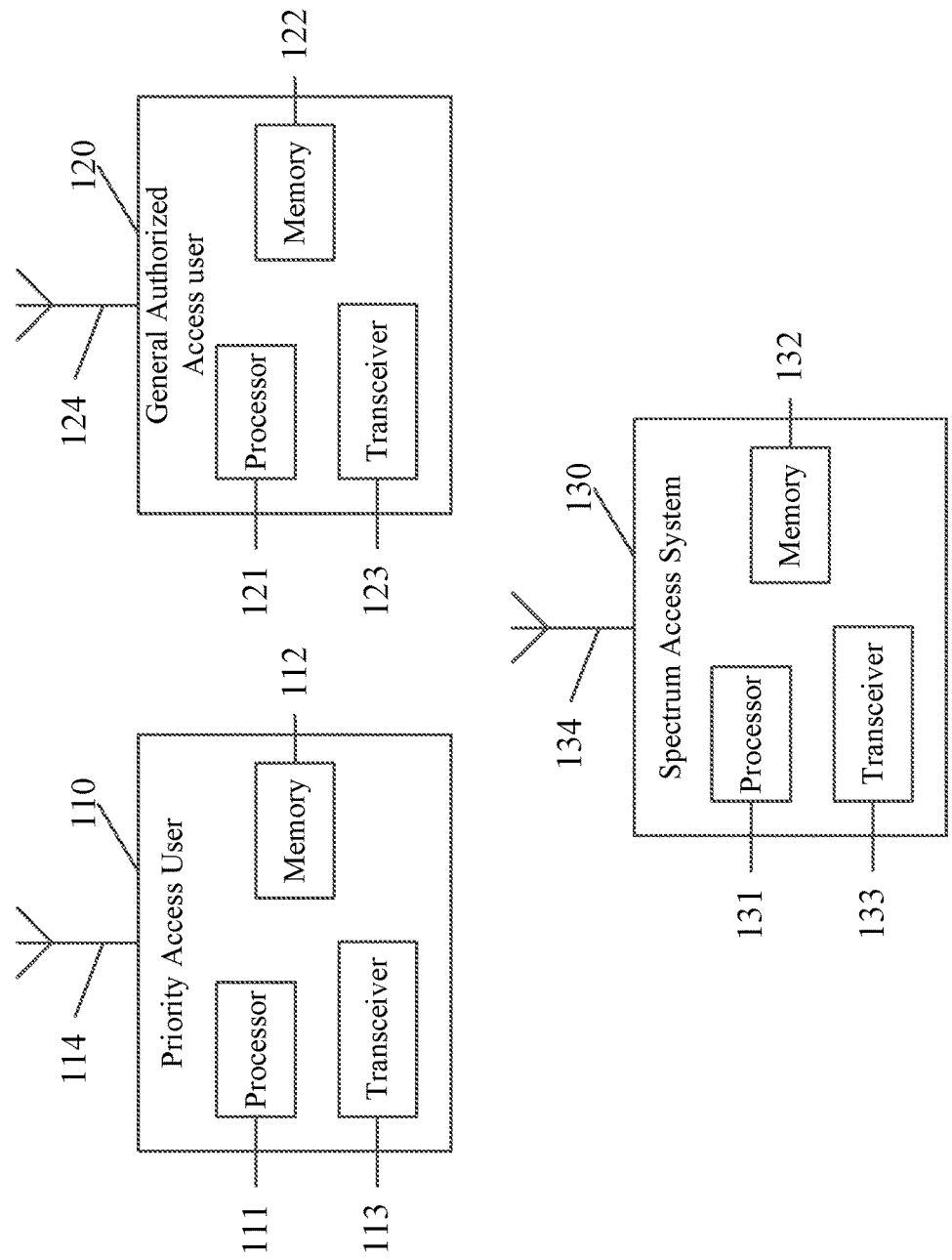
FIG. 1 illustrates an example of a system according to certain embodiments.

FIG. 1 illustrates a system according to certain embodiments. In one embodiment, a system may include multiple devices, such as, for example, priority access (PA) user device 110, general authorized access (GAA) user device 120, and spectrum access system (SAS) 130. PA user device 110 and/or GAA user device 120 may include one or more of a vehicle, such as an automobile and a motorcycle, mobile device, such as a mobile phone, smart phone, personal digital assistant (PDA), tablet, or portable media player, digital camera, pocket video camera, video game console, navigation unit, such as a global positioning system (GPS) device, desktop or laptop computer, single-location device, such as a sensor or smart meter, or any combination thereof. SAS 130 may be one or more of a base station, such as an evolved node B (eNB) or next generation node B (gNB), a next generation radio access network (NG RAN), a mobility management entity (MME), a serving gateway, a server, and/or any other access node or combination thereof. One or more of the devices may also include a next generation radio access network, mobility management entity, serving gateway, base station, such as an evolved node B (eNB) or next generation node B (gNB), a server, and/or other access node. Furthermore, a citizens broadband radio service (CBRS) device (CBSD) may include one or more of a PA user device and/or a GAA user device, such as PA user device 110 and GAA user device 120.

One or more of these devices may include at least one processor, respectively indicated as 111, 121, and 131. At least one memory may be provided in one or more of devices indicated at 112, 122, and 132. The memory may be fixed or removable. The memory may include computer program instructions or computer code contained therein. Processors 111, 121, and 131 and memory 112, 122, and 132, or a subset thereof, may be configured to provide means corresponding to the various blocks of FIGS. 2-10. Although not shown, the devices may also include positioning hardware, such as global positioning system (GPS) or micro electrical mechanical system (MEMS) hardware, which may be used to determine a location of the device. Other sensors are also permitted and may be included to determine location, elevation, orientation, and so forth, such as barometers, compasses, and the like.

As shown in FIG. 1, transceivers 113, 123, and 133 may be provided, and one or more devices may also include at least one antenna, respectively illustrated as 114, 124, and 134. The device may have many antennas, such as an array of antennas configured for multiple input multiple output (MIMO) communications, or multiple antennas for multiple radio access technologies. Other configurations of these devices, for example, may be provided.

Transceivers 113, 123, and 133 may be a transmitter, a receiver, or both a transmitter and a receiver, or a unit or device that may be configured both for transmission and reception.

Processor 111, 121, and 131 may be embodied by any computational or data processing device, such as a central processing unit (CPU), application specific integrated circuit (ASIC), or comparable device. The processors may be implemented as a single controller, or a plurality of controllers or processors.

Memory 112, 122, and 132 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate from the one or more processors. Furthermore, the computer program instructions stored in the memory and which may be processed by the processors may be any suitable form of computer program code, for example, a compiled or interpreted computer program written in any suitable programming language.

The memory and the computer program instructions may be configured, with the processor for the particular device, to cause a hardware apparatus such as user equipment to perform any of the processes described below (see, for example, FIGS. 2-10). Therefore, in certain embodiments, a non-transitory computer-readable medium may be encoded with computer instructions that, when executed in hardware, perform a process such as one of the processes described herein. Alternatively, certain embodiments may be performed entirely in hardware.

Figure 2:
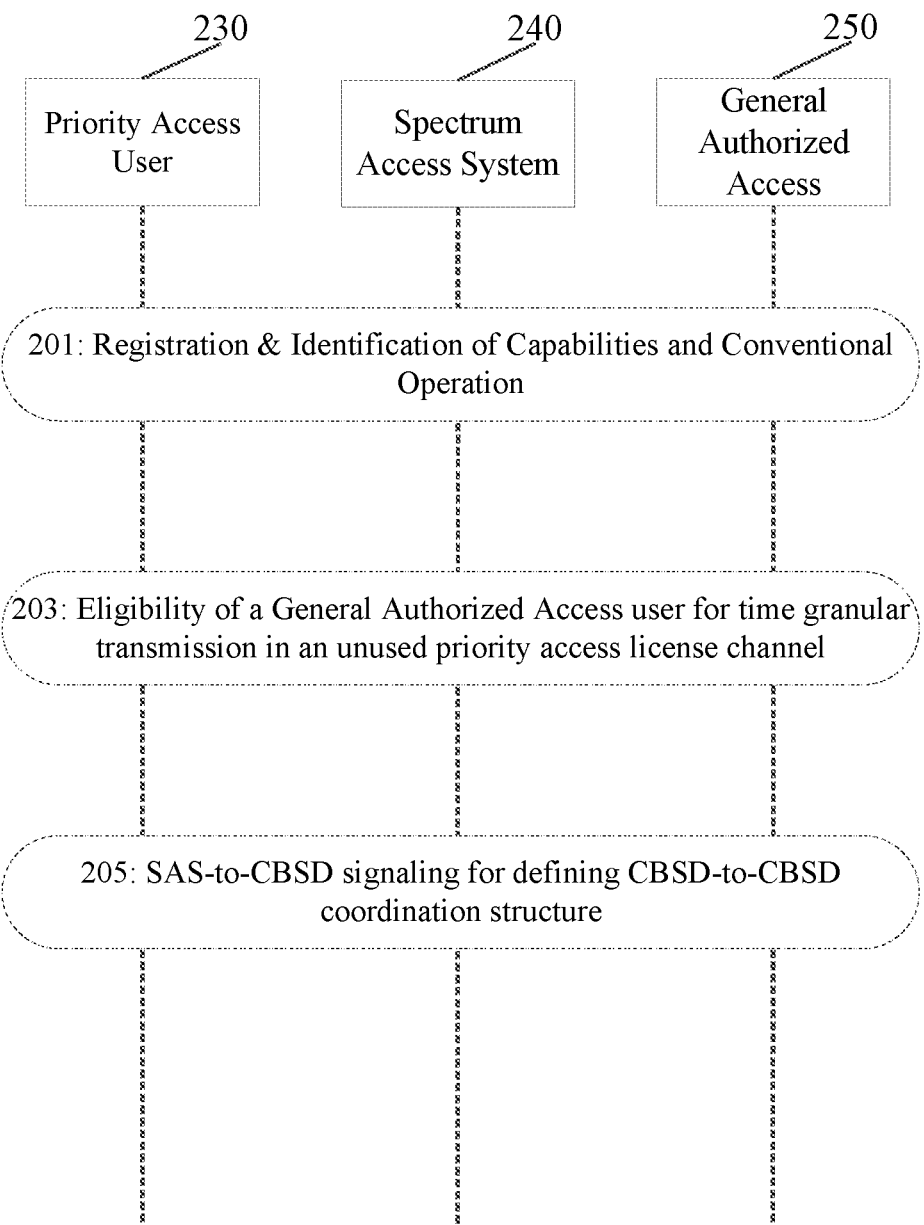
FIG. 2 illustrates another example of a system according to certain embodiments.

FIG. 2 illustrates signaling between a SAS, such as SAS 240, and a Priority Access (PA) user device, such as PA user device 230, and a General Authorized Access (GAA) user device, such as GAA user 250. In some embodiments, PA user device 230 may be PA user device 110, GAA user device 250 may be GAA user device 120, and SAS 240 may be SAS 130. In first state 201, PA user device 230 and GAA user device 250 perform registration and identification of capabilities. In second state 203, PA user device 230 and GAA user device 250 operate to determine eligibility of GAA user device 250 for time granular transmission in a temporarily unused priority access license channel. In third state 205, PA user device 230 and GAA user device 250 perform SAS-to-CBSD signaling that defines CBSD-to-CBSD coordination structure. Each of these three stages is discussed in detail below.

FIG. 3 illustrates detailed operations of first state 201, second state 203, and third state 205 as illustrated in FIG. 2. During first state 201 for registration and identification, one or more Registration Request messages may be transmitted from a PA user device, such as PA user device 330, to a SAS, such as SAS 340. In some embodiments, the one or more Registration Request messages may include conditional fields that may include various information. In some embodiments, some fields may be an object type, which may carry detailed information.

FIG. 4 describes one or more Registration Request messages R1 that may be transmitted from a PA user device or a GAA user device to a SAS that may carry one or more parameters associated with specific types and other information. In some embodiments, a Registration Request message may include parameter "userID," which may be a string type, and may be a required parameter. In some embodiments, a Registration Request message may include parameter "fccID," which may be a string type, and may be a required parameter. In some embodiments, a Registration Request message may include parameter "cbsdSerialNumber," which may be a string type, and may be a required parameter. In some embodiments, a Registration Request message may include parameter "cbsdCategory," which may be a string type, and may be a conditional parameter. In some embodiments, a Registration Request message may include parameter "cbsdInfo," which may be an object type, and may be an optional parameter. In some embodiments, a Registration Request message may include parameter "airInterface," which may be an object type, and may be a conditional parameter. In some embodiments, a Registration Request message may include parameter "installationParam," which may be an object type, and may be a conditional parameter. In various embodiments, a "installationParam" parameter may include one or more of location information and/or technical information. In some embodiments, a Registration Request message may include parameter "measCapability," which may be an array of string type, and may be a conditional parameter. In various embodiments, a "measCapability" parameter may include technical information. In various embodiments, a "timeGranularSharingCapability" parameter may be included in a Registration Request message, and may be a boolean parameter. Furthermore, a "timeGranularSharingCapability" parameter may inform an SAS about the CBSD capability.

As further illustrated in FIG. 3, one or more Registration Response messages R2 may be transmitted from the SAS 240 to the CBSD, which may be either the PA user device 230 or the GAA user device 250, and may be in response to one or more previous Registration Request messages R1 have been transmitted from a CBSD to the SAS 240. In various embodiments, SAS 340 may receive one or more Registration Request messages R1 containing an optional boolean parameter "timeGranularSharingCapability" parameter from a CBSD, and informs SAS 340 of the CBSD possessing this capability. In various embodiments, a CBSD may receive one or more Registration Response messages R2 containing an optional boolean parameter "timeGranularSharingCapability" parameter from a SAS, and informs a CBSD of the SAS possessing this capability.

As further illustrated in FIG. 3, one or more Grant Request messages G1 may be transmitted from a CBSD to SAS. In response to Grant Request messages G1, one or more Grant Response messages G2 may be transmitted from the SAS to the CBSD. As shown in FIG. 5, a Grant Response message may include parameter "cbsdID," which may be a string type, and may be a conditional parameter. In some embodiments, a Grant Response message may include parameter "grantID," which may be a string type, and may be a conditional parameter. In some embodiments, a Grant Response message may include parameter "grantExpireTime," which may be a string type, and may be a conditional parameter. In further embodiments, a "grantExpireTime" parameter may indicate the coordinated universal time (UTC) of when the grant expires, and may be expressed using format YYYY-MM-DDhhmmssZ. In some embodiments, one or more CBSDs in a CBRS may be synchronized, or have the means to be synchronized, with UTC.

Furthermore, in some embodiments, a Grant Response message may include parameter "heartbeatInterval," which may be a number type, and may be a conditional parameter. In further embodiments, a "heartbeatInterval" may indicate the maximum time interval, expressed in seconds, between two consecutive heartbeat requests. In some embodiments, a Grant Response message may include parameter "measReportConfig," which may be an array of string type, and may be an optional parameter. In some embodiments, a Grant Response message may include parameter "operationParam," which may be an object type, and may be an optional parameter. In some embodiments, a Grant Response message may include parameter "channelType," which may be a string parameter, and may be an optional parameter. In some embodiments, a Grant Response message may include parameter "response," which may be an object type, and may be a required parameter. In some embodiments, parameters which are conditional parameters may be included in one or more Grant Response messages where the SAS approves the grant request in the Grant Request message. In some embodiments, the "cbsdID" parameter in a Grant Response message may be included when the "cbsdID" parameter in a Grant Request message is valid.

As further illustrated in FIG. 3, one or more Heartbeat Request messages H1 may be transmitted from the CBSD to SAS. As shown in FIG. 6, a Heartbeat Request message may include parameter "cbsdID," which may be a string type, and may be a required parameter. In some embodiments, a Heartbeat Request message may include parameter "grantID," which may be a string type, and may be a required parameter. In some embodiments, a Heartbeat Request message may include parameter "grantRenew," which may be a boolean type, and may be an optional parameter. In some embodiments, a Heartbeat Request message may include parameter "operationState" parameter, which may be a string type, and may be a required parameter. In further embodiments, an "operationState" parameter may contain the operation state of the CBSD, such as "AUTHORIZED" or "GRANTED." In some embodiments, a Heartbeat Request message may include parameter "measReport," which may be an object type, and may be a conditional parameter.

As further illustrated in FIG. 3, one or more Heartbeat Response messages H2 may be transmitted from the SAS to the CBSD. As shown in FIG. 7, a Heartbeat Response message may include parameter "cbsdID," which may be a string type, and may be a conditional parameter. In some embodiments, a Heartbeat Response message may include parameter "grantID," which may be a string type, and may be a conditional parameter. In some embodiments, a Heartbeat Response message may include parameter "transmitExpireTime," which may be a string type, and may be required parameter. In further embodiments, a "transmitExpireTime" parameter may indicate the coordinated universal time (UTC) that the CBSD may transmit until, and may be expressed using format YYYY-MM-DDhhmmssZ.

In some embodiments, a Heartbeat Response message may include parameter "grantExpireTime" parameter, which may be a string type, and may be a conditional parameter. In some embodiments, a Heartbeat Response message may include parameter "heartbeatInterval," which may be a number type, and may be an optional parameter. In further embodiments, a "heartbeatInterval" may be a positive integer expressed in units of seconds, and may allow the SAS to change the heartbeat interval. In some embodiments, a Heartbeat Response message may include parameter "operationParam," which may be an object type, and may be an optional parameter. In further embodiments, a "operationParam" may allow the SAS to provide a new set of operation parameters to the CBSD. In some embodiments, a Heartbeat Response message may include parameter "measReportConfig," which may be an array of strings type, and may be an optional parameter. In some embodiments, a Heartbeat Response message may include parameter "response," which may be an object type, and may be a required parameter.

In some embodiments, a CBSD cannot activate its radio transmitter until the CBSD Heartbeat procedure has been successfully completed. By completing the CBSD Heartbeat procedure, the CBSD is able to inform the SAS that it is requesting authorization to use or continue to use a granted spectrum. Furthermore, the SAS may suspend or terminate a grant, and the SAS may recommend different operational parameters to the CBSD.

Upon completion of the exchange of the Heartbeat Request message H1 and Heartbeat Request message H2, the PA user device may access the spectrum channel, and may be authorized to transmit. The GAA user device may not have access to this PAL channel Thus, the GAA user device may only exchange the conventional periodic heartbeat messages H1 and H2 with the SAS. In some embodiments, the GAA user device may be moved from "GRANTED" status to "AUTHORIZED" status, but may only be able use a channel other than that used by the PA user device.

Upon entering second phase 203, the SAS may evaluate whether a particular GAA user device that possesses a time granular sharing capability is capable of detecting a PA user device operation in a particular PAL channel. For example, the SAS may receive measurement reports one or more CBSDs, such as PA user 230 and/or GAA user 250, in the Heartbeat Request H1 messages, estimation of path loss between multiple CBSDs, or other metrics. If the SAS determines whether a particular GAA user device that possesses a time granular sharing capability is capable of detecting a PA user device operation in a particular PAL channel, the SAS may evaluate whether the GAA user device is a unique transmitter in the particular PAL channel, and/or may generate harmful interference to other PA users allocated in other channels or areas.

During second phase 203, the GAA user device may be determined to be eligible to opportunistically use a PAL channel when it is not in use by the PA user device. The GAA user device transmissions will be allowed only during time intervals when there are no PA user device transmissions in the channel. This not only protects the PA user device operating in the PAL channel, but also avoids aggregate interference above a threshold level for other user devices, and in areas in case the PA user and/or GAA user device would transmit simultaneously in the PAL channel.

Upon entering third phase 205, once a GAA user device has been determined to use a PAL channel opportunistically and temporarily while unused by the PA user device, both the PA user device and the GAA user device may be moved to an "AUTHORIZED" state, including a "TimeGranularAuthorized" state. The transition to an "AUTHORIZED" state may occur following a request of the GAA user device for a specific channel, and/or may be enforced by the SAS to enhance the spectrum usage efficiency.

Figure 9:
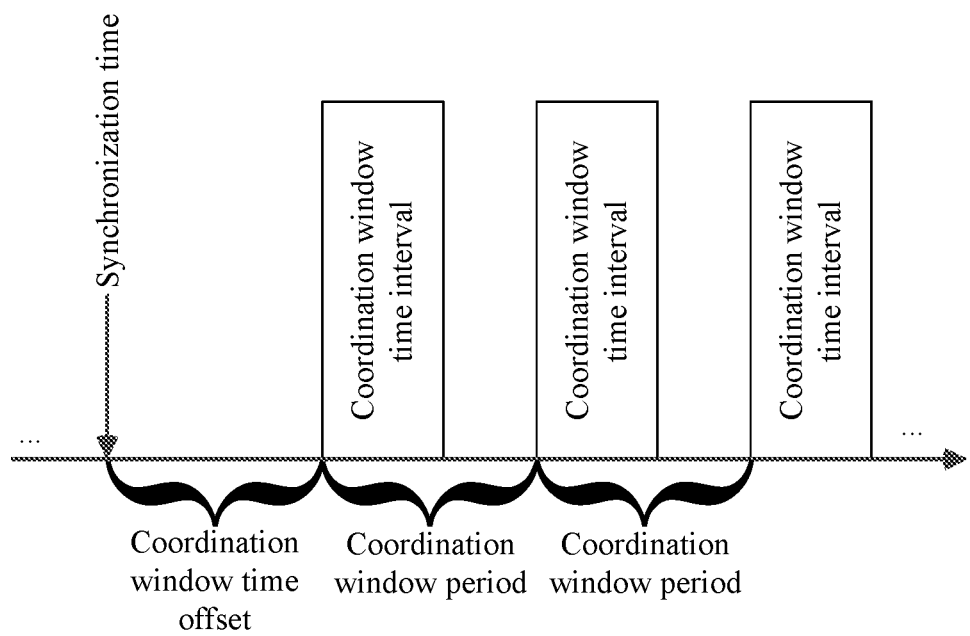
FIG. 9 illustrates an example of coordination windows according to certain embodiments.

The operation of the "AUTHORIZED" state requires CBSD-to-CBSD coordination, as shown in FIG. 9. In step 901, the PA user device and the GAA user device may be synchronized, for example, the SAS may communicate with both the GAA user device and the PA user device to define a specific time as a reference for both devices. The synchronization time set for the PA user device and the GAA user device may be set by the SAS as a future time that the SAS will communicate with both the PA user device and the GAA user device.

After defining a reference time, the SAS may define and communicate to both the PA user device and the GAA user device one or more values for one or more time parameters that enable their over-the-air coordination during specific time windows in the PAL channel. For example, the time parameters may include one or more of a coordination window time offset, a coordination window time duration, and/or a coordination window period.

FIG. 8 illustrates fields that may be added to the Heartbeat Response H2 message. In some embodiments, the SAS-CBSD signaling performed in first stage 201 and second stage 203 and converting CBSDs to a "TimeGranularAuthorized" state may require only one message from the SAS to each CBSD. In some embodiments, this may be accomplished by the periodic Heartbeat Response message H2 by using additional parameters, as described in FIG. 8. In some embodiments, a Heartbeat Response message may include parameter "synchronizationTime," which may be a string type, and may be an optional parameter. In some embodiments, the "synchronizationTime" parameter may be expressed using the format YYYY-MM-DDThh:mm:ssZ. In some embodiments, a Heartbeat Response message may include parameter "coordinationWindowTimeOffset," which may be a number type, and may be an optional parameter. In some embodiments, the "coordinationWindowTimeOffset" may be a positive integer in units of seconds.

In some embodiments, a Heartbeat Response message may include parameter "coordinationWindowTimeDuration," which may be a number type, and may be an optional parameter. In some embodiments, the "coordinationWindowTimeDuration" may be a positive integer in units of seconds. In some embodiments, a Heartbeat Response message may include parameter "coordinationWindowTimePeriod," which may be a number type, and may be an optional parameter. In some embodiments, the "coordinationWindowTimePeriod" may be a positive integer in units of seconds. In some embodiments, a Heartbeat Response message may include parameter "inactivityTime," which may be a number type, and may be an optional parameter. In further embodiments, the "inactivityTime" may be a positive integer that indicates the number of consecutive coordination windows without transmissions from the PA user device which the PA user device may take action before beginning transmission, and/or the GAA may use the channel.

In some embodiments, one or more parameters in the Heartbeat Response message H2 that is transmitted from the SAS to the CBSD may indicate to the CBSD that the CBSD is being moved to, or remaining in, the "TimeGranularAuthorized" state. The Heartbeat Response message H2 may contain additional parameters, such as those described in FIG. 7.

In some embodiments, one or more Heartbeat Response messages H2 that are sent by the SAS may be followed by additional Heartbeat Request messages H1 and Heartbeat Response messages H2. For example, a first Heartbeat Request message H1 may set a short time period for sending the next Heartbeat Request messages H1 by using the "heartbeatInterval" parameter. By receiving subsequent Heartbeat Request H1 messages from CBSDs with the same additional, optional fields and parameters as sent in the first Heartbeat Request H1 message, such as the "operationState" field being set as the "TimeGranularAuthorized," the SAS may confirm setup by the CBSD, and/or may responds with a new Heartbeat Response H2 message that has the "heartbeatInterval" set for a longer time value. This may establish the "TimeGranularAuthorized" state between the PA user device and the GAA user device.

In some embodiments, the time validity of the proposed operation mode may be limited by the time interval between the two consecutive Heartbeat Request H1 messages between the SAS and two CBSD user devices. In some embodiments, the change of operation parameters may occur as a result of SAS indicating new parameters in the "operationParam" field in the Heartbeat Request H2 messages, followed by a new exchange of Heartbeat Request H1 messages and Heartbeat Response messages H2 between the SAS and CBSD to confirm the new configuration. For example, the SAS may use the field "heartbeatInterval" in a Heartbeat Response H2 message to configure a short time interval for the next Heartbeat Request H1 message to be sent by the CBSDs. After receiving the subsequent Heartbeat Request H1 message, the SAS may include in subsequent Heartbeat Response H2 messages the "heartbeatInterval" field, which may be a longer heartbeat time interval.

In some embodiments, the termination of the proposed operation mode may be triggered by the SAS and/or by the CBSDs. For example, the SAS may use a Heartbeat Response H2 message to negate a request to renew a grant, terminate a grant, and/or provide new channel frequencies in the "operationParam" object. In various embodiments, the CBSD may use a CBSD Grant Relinquishment procedure to send a Relinquishment Request to inform the SAS that the grant is no longer requested.

After entering a "TimeGranularAuthorized" state, a PA user device is a higher priority user device and is fully protected from GAA interference. For example, a PA user device may transmit normally during coordination windows, but may track the number of consecutive coordination windows during which it made no transmission. If the counter achieves a certain number of consecutive coordination windows informed by the SAS in the "inactivityTime" window included in a Heartbeat Response H2 message, then the PA user device may indicate the activity by a full channel bandwidth transmission during the next coordination window. The PA user device may then restart the counter, and resume transmission in an "AUTHORIZED" state, including data transmissions during one or more coordination windows.

In addition, a GAA user device may continue to monitor coordination windows, and may include a counter for the number of consecutive coordination windows during which no PA user device transmission is detected. If the counter achieves a certain number of consecutive coordination windows provided by the SAS in the "inactivityTime" parameter in the Heartbeat Response H2 message, the GAA may be allowed to use the PAL channel, and may not transmit during the coordination windows. In some embodiments, the GAA user device continues to use the PAL channel, and/or listens to the coordination windows until receiving an indication of transmission of the PA user device resuming transmission through a full channel bandwidth transmission during a coordination window. The GAA user device may then cease transmission, restart the counter, and continue listening to the coordination window for detection of a new inactivity period for the PA user device.

FIG. 9 illustrates the structure of one or more coordination windows. These periodic time windows for coordination between one or more PA user devices and one or more GAA user devices is defined and valid during a given time period.

In order to avoid inefficiencies that may occur with conventional SAS-CBSD communication, periodic coordination windows allow for PA user devices and GAA user devices to send and receive indications regarding the availability and use of the channel in a second signaling layer. For example, instead of resuming and starting transmission, a PA user device indicates in the next periodic coordination window that it will use the channel by transmitting a full channel bandwidth signal during the coordination window.

Figure 10:
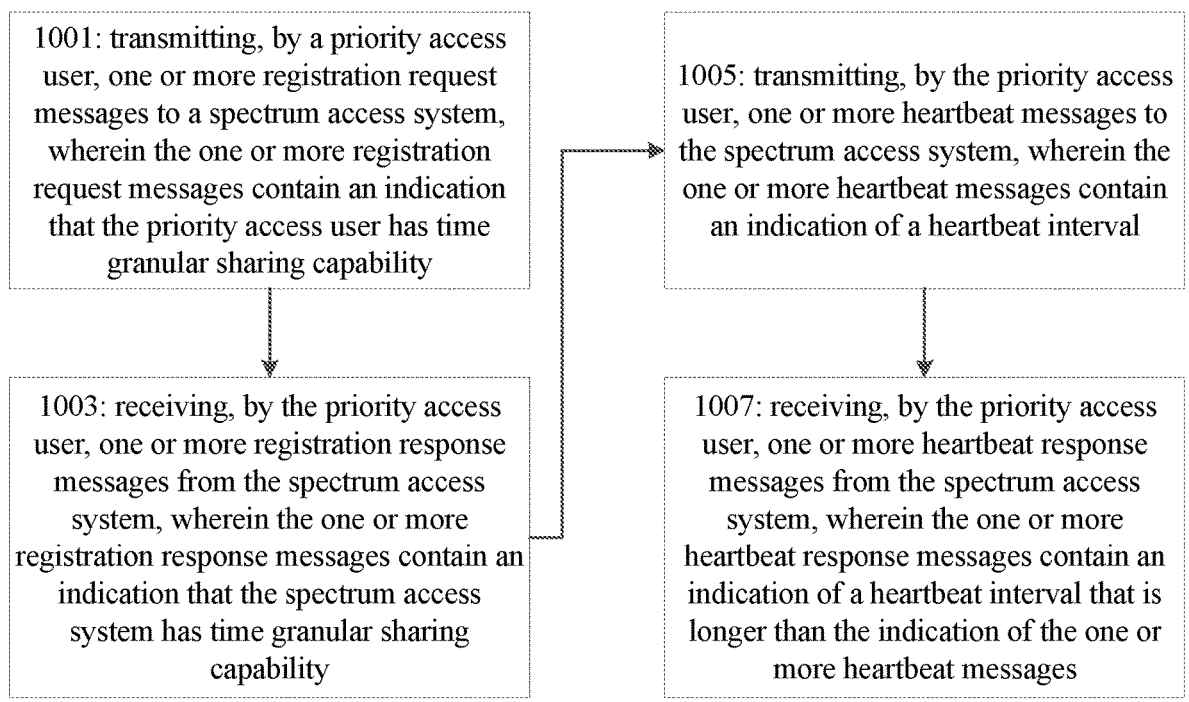
FIG. 10 illustrates an example of a method performed by a citizens broadband radio service device, such as a priority access user device, according to certain embodiments.

FIG. 10 illustrates an example method of a priority access user device entering into a time-based spectrum sharing framework. In step 1001, a priority access user device transmits one or more registration request messages to a spectrum access system. The one or more registration request messages may contain an indication that the priority access user device has time granular sharing capability. In step 1003, the priority access user device receives one or more registration response messages from the spectrum access system. The one or more registration response messages may contain an indication that the spectrum access system has time granular sharing capability. In step 1005, the priority access user device transmits one or more heartbeat messages to the spectrum access system. The one or more heartbeat messages may contain an indication of a heartbeat interval. In step 1007, the priority access user device receives one or more heartbeat response messages from the spectrum access system. The one or more heartbeat response messages may contain an indication of a heartbeat interval that is longer than the indication of the one or more heartbeat messages.

Figure 11:
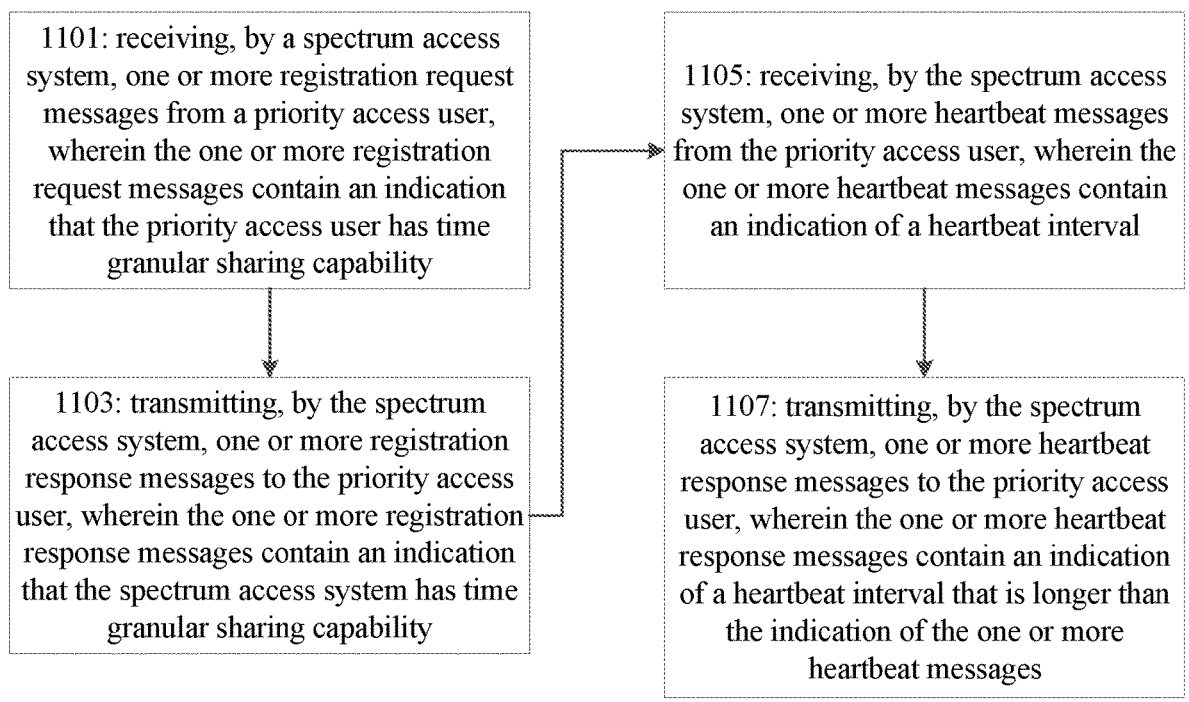
FIG. 11 illustrates another example of a method performed by a spectrum access system according to certain embodiments.

FIG. 11 illustrates an example method of a spectrum access system providing a time-based spectrum sharing framework for a citizens broadband radio service. In step 1101, a spectrum access system receives one or more registration request messages from a priority access user device. The one or more registration request messages may contain an indication that the priority access user device has time granular sharing capability. In step 1103, the spectrum access system transmits one or more registration response messages to the priority access user device. The one or more registration response messages may contain an indication that the spectrum access system has time granular sharing capability. In step 1105, the spectrum access system receives one or more heartbeat messages from the priority access user device. The one or more heartbeat messages may contain an indication of a heartbeat interval. In step 1107, the spectrum access system transmits one or more heartbeat response messages to the priority access user device. The one or more heartbeat response messages may contain an indication of a heartbeat interval that is longer than the indication of the one or more heartbeat messages.

Certain embodiments of the present invention may have various benefits and/or advantages. For example, certain embodiments are directed to improvements in computer-related technology, specifically, by providing techniques that reduce interference between PA user devices and GAA user devices, while limiting unnecessary messaging between network entities and conserving limited network resources.

One having ordinary skill in the art will readily understand that certain embodiments discussed above may be practiced with steps in a different order, and/or with hardware elements in configurations which are different than those which are disclosed. Therefore, it would be apparent to those of skill in the art that certain modifications, variations, and alternative constructions would be apparent, while remaining within the spirit and scope of the invention. In order to determine the metes and bounds of the invention, therefore, reference should be made to the appended claims.

PARTIAL GLOSSARY

CBRS Citizens Broadband Radio Service
CBSD Citizens Broadband Radio Service Device
EIRP Effective Isotropic Radiated Power
ESC Environmental Sensing Capability
FCC Federal Communications Commission
FSS Fixed Satellite Service
GAA General Authorized Access
HTTPS Hypertext Transfer Protocol Secure
JSON JavaScript Objection Notification
LTE Long-Term Evolution
PA Priority Access
PAL Priority Access License
PPA Priority Access License Protection Area
RAT Radio Access Technology
RLS Radio Location Service
SAS Spectrum Access System
UTC Coordinated Universal Time
WINNFORUM Wireless Innovation Forum

I claim:

1. An apparatus, comprising:
   at least one processor; and
   at least one memory including computer program code,
   wherein the at least one memory and the computer program code are configured to, with the at least one processor, cause the apparatus to at least:
   transmit one or more registration request messages to a spectrum access system, wherein the one or more registration request messages contain an indication that a priority access user device has time granular sharing capability;
   in response to the one or more registration request messages, receive one or more registration response messages from the spectrum access system, wherein the one or more registration response messages contain an indication that the spectrum access system has time granular sharing capability;
   transmit one or more heartbeat messages to the spectrum access system based upon the indication that the spectrum access system has time granular sharing capability, wherein the one or more heartbeat messages contain an indication of a heartbeat interval;
   in response to the one or more heartbeat messages, receive one or more heartbeat response messages from the spectrum access system, wherein the one or more heartbeat response messages contain an indication of a heartbeat interval that is longer than the indication of the one or more heartbeat messages; and
   wherein the heartbeat response message includes one or more of a synchronization time, a coordination window time offset, a coordination window time duration, a coordination window time period, and an inactivity time.

2. The apparatus according to claim 1, wherein the inactivity time is a positive integer that defines a number of coordination windows without transmissions from the priority access user device.

3. The apparatus according to claim 1, wherein the inactivity time is a positive integer that defines a number of coordination windows without transmissions from the priority access user device over which the priority access user device must take some action before resuming transmission.

4. The apparatus according to claim 1, wherein the inactivity time is a positive integer that defines a number of coordination windows without transmissions from the priority access user device over which a general authorized access user device is allowed to use a channel.

5. The apparatus according to claim 1, wherein the one or more registration request messages contain an indication that the priority access user device has citizens broadband radio service device capability.

6. The apparatus according to claim 1, wherein the one or more registration response messages contain an indication that the spectrum access system has citizens broadband radio service device capability.

7. A method, comprising:
transmitting, by a priority access user device, one or more registration request messages to a spectrum access system, wherein the one or more registration request messages contain an indication that the priority access user device has time granular sharing capability;
in response to the one or more registration request messages, receiving, by the priority access user device, one or more registration response messages from the spectrum access system, wherein the one or more registration response messages contain an indication that the spectrum access system has time granular sharing capability;
transmitting, by the priority access user device, one or more heartbeat messages to the spectrum access system based upon the indication that the spectrum access system has time granular sharing capability, wherein the one or more heartbeat messages contain an indication of a heartbeat interval;
in response to the one or more heartbeat messages, receiving, by the priority access user device, one or more heartbeat response messages from the spectrum access system, wherein the one or more heartbeat response messages contain an indication of a heartbeat interval that is longer than the indication of the one or more heartbeat messages; and
wherein the heartbeat response message includes one or more of a synchronization time, a coordination window time offset, a coordination window time duration, a coordination window time period, and an inactivity time.

8. The method according to claim 7, wherein the inactivity time is a positive integer that defines a number of coordination windows without transmissions from the priority access user device.

9. The method according to claim 7, wherein the inactivity time is a positive integer that defines a number of coordination windows without transmissions from the priority access user device over which the priority access user device must take some action before resuming transmission.

10. The method according to claim 7, wherein the inactivity time is a positive integer that defines a number of coordination windows without transmissions from the priority access user device over which a general authorized access user device is allowed to use a channel.

11. The method according to claim 7, wherein the one or more registration request messages contain an indication that the priority access user device has citizens broadband radio service device capability.

12. The method according to claim 7, wherein the one or more registration response messages contain an indication that the spectrum access system has citizens broadband radio service device capability.

13. An apparatus, comprising:
at least one processor; and
at least one memory including computer program code, wherein the at least one memory and the computer program code are configured to, with the at least one processor, cause the apparatus to at least:
receive one or more registration request messages from a priority access user device, wherein the one or more registration request messages contain an indication that the priority access user device has time granular sharing capability;
in response to the one or more registration request messages, transmit one or more registration response messages to the priority access user device, wherein the one or more registration response messages contain an indication that a spectrum access system has time granular sharing capability;
receive one or more heartbeat messages from the priority access user device based upon the indication that the spectrum access system has time granular sharing capability, wherein the one or more heartbeat messages contain an indication of a heartbeat interval;
in response to the one or more heartbeat messages, transmit one or more heartbeat response messages to the priority access user device, wherein the one or more heartbeat response messages contain an indication of a heartbeat interval that is longer than the indication of the one or more heartbeat messages; and
wherein the heartbeat response message includes one or more of a synchronization time, a coordination window time offset, a coordination window time duration, a coordination window time period, and an inactivity time.

14. The apparatus according to claim 13, wherein the inactivity time is a positive integer that defines a number of coordination windows without transmissions from the priority access user device.

15. The apparatus according to claim 13, wherein the inactivity time is a positive integer that defines a number of coordination windows without transmissions from the priority access user device over which the priority access user device must take some action before resuming transmission.

16. The apparatus according to claim 13, wherein the inactivity time is a positive integer that defines a number of coordination windows without transmissions from the priority access user device over which a general authorized access user device is allowed to use a channel.

17. The apparatus according to claim 13, wherein the one or more registration request messages contain an indication that the priority access user device has citizens broadband radio service device capability.

18. The apparatus according to claim 13, wherein the one or more registration response messages contain an indication that the spectrum access system has citizens broadband radio service device capability.

19. A method, comprising:
receiving, by a spectrum access system, one or more registration request messages from a priority access user device, wherein the one or more registration request messages contain an indication that the priority access user device has time granular sharing capability;
in response to the one or more registration request messages, transmitting, by the spectrum access system, one or more registration response messages to the priority access user device, wherein the one or more registration response messages contain an indication that the spectrum access system has time granular sharing capability;
receiving, by the spectrum access system, one or more heartbeat messages from the priority access user device based upon the indication that the spectrum access system has time granular sharing capability, wherein the one or more heartbeat messages contain an indication of a heartbeat interval;

in response to the one or more heartbeat messages, transmitting, by the spectrum access system, one or more heartbeat response messages to the priority access user device, wherein the one or more heartbeat response messages contain an indication of a heartbeat interval that is longer than the indication of the one or more heartbeat messages; and wherein the heartbeat response message includes one or more of a synchronization time, a coordination window time offset, a coordination window time duration, a coordination window time period, and an inactivity time.

20. The method according to claim 19, wherein the inactivity time is a positive integer that defines a number of coordination windows without transmissions from the priority access user device.

21. The method according to claim 19, wherein the inactivity time is a positive integer that defines a number of coordination windows without transmissions from the priority access user device over which the priority access user device must take some action before resuming transmission.

* * * * *